J. S. & E. W. LETTS.
Dish-Cleaning Machine.
No. 197,480. Patented Nov. 27, 1877.
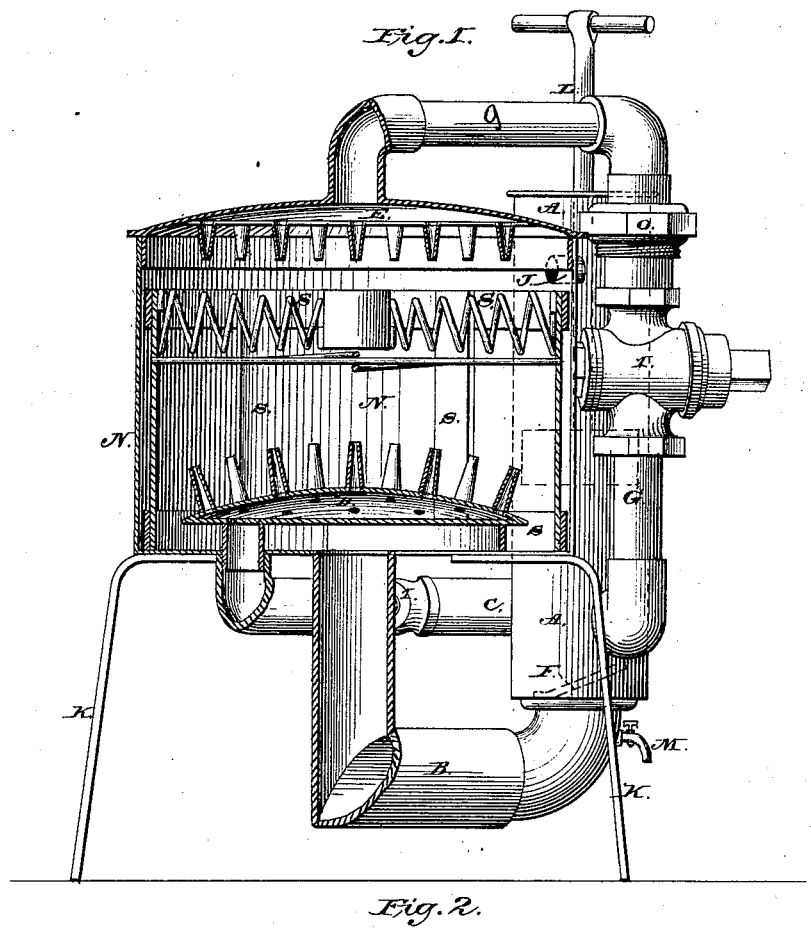
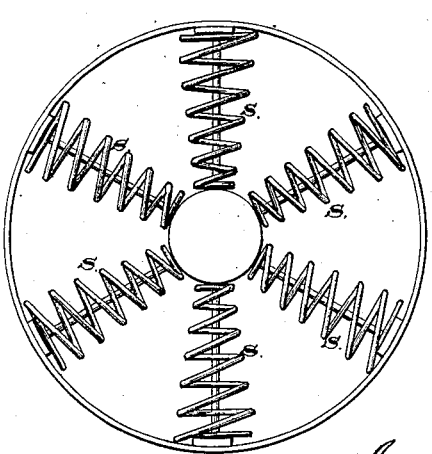
Attest:
W. R. Lyle
Stella Letts.
Inventor:
Jeremiah S. Letts
Elizabeth W. Letts

UNITED STATES PATENT OFFICE.

JEREMIAH S. LETTS AND ELIZABETH W. LETTS, OF RIPON, WISCONSIN.

IMPROVEMENT IN DISH-CLEANING MACHINES.

Specification forming part of Letters Patent No. 197,480, dated November 27, 1877; application filed April 2, 1877.

*To all whom it may concern:*

Be it known that we, JEREMIAH S. LETTS and ELIZABETH W. LETTS, his wife, of the city of Ripon, in the county of Fond du Lac and State of Wisconsin, have invented a new and useful Machine for Washing Dishes; and we hereby declare the following to be a clear and exact description thereof, reference being had to the accompanying drawings, which are lettered to correspond with and form a part of this specification.

Figure 1 is a perspective sectional view of our device, which consists of a pan or tub, N, arranged as shown in the drawings, with a flat, drum-like cylinder, D, near the bottom of the pan, with numerous tubes inserted through the upper plate of the drum. The pan has also a cover, with a similar drum-shaped cylinder, E, attached to the inside of the cover, with tubes inserted through the lower plate, as shown in the drawings. These drums and the pan are connected with a common force-pump, A, with piston L, having a close or solid head or plunger.

The barrel of the pump has a common valve, $s$, opening upward. The pump-barrel is of sufficient capacity to fill the pipes $c$ and $g$, and the drums E and D, with water when in use, and is connected with the pan and drums, as shown in the drawing, by the pipes B, $c$, and $g$.

The bottom of the pan is elevated above the lower end of the pump in such a way that the pump is fed from the pan on the fountain principle.

Pipe B serves as a feed-pipe to supply the pump with water from the pan.

When the plunger L is pressed downward the valve F closes down, and the water is forced through the pipes $c$ and $g$ into the drums E and D. The drums, having tubes on their upper and lower surfaces, divide the water into numerous streams, and convey it upward and downward upon the dishes. Pipes $c$ and $g$ are arranged with stop-cocks 1 1.

By closing the cock in pipe $c$ the water is all forced through pipe $g$, and is thrown only downward upon the dishes. By closing the cock in pipe $g$ the water is all forced through the pipe $c$, and is thrown only upward upon the dishes.

Pipe $g$ is arranged with a common union coupling-nut, $o$, and the pipes are packed between the ends, in the usual way, to prevent leaking.

J is a waste-pipe to convey any waste-water that escapes past the plunger back into the pan N. K K K K are legs to support the pan, and M is a faucet to draw off the water.

The dishes are placed in a detached rack, S, made of coiled wires, attached across the pan to bands that pass around the inside of the pan, by means of which the dishes may be placed between the drums and removed at pleasure.

What we claim as new and useful, and desire to secure by Letters Patent of the United States, is as follows:

1. The combination and arrangement of the pump A, connected with the pan N and drums E and D by the pipes $c$, $g$, and B.

2. The drums E and D and the rack S for holding the dishes, all suitably arranged and operating in the manner and for the purpose set forth.

In testimony whereof we have hereunto subscribed our names in the presence of two witnesses.

JEREMIAH S. LETTS.
ELIZABETH W. LETTS.

Witnesses:
W. R. LYLE,
STELLA LETTS.